Feb. 16, 1965  C. R. WESNER  3,169,501
SHIP STABILIZATION APPARATUS
Filed Jan. 30, 1963
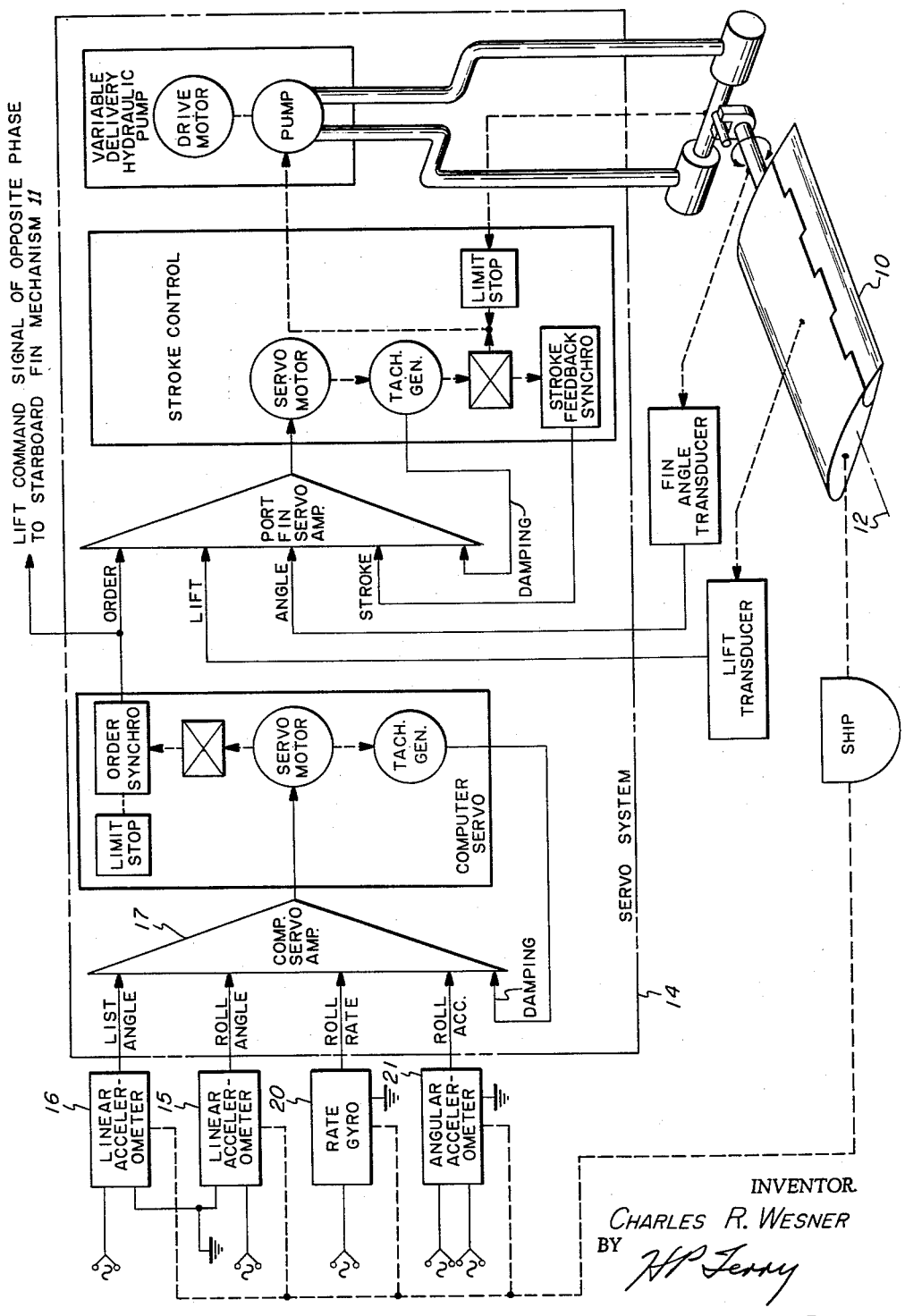
INVENTOR.
CHARLES R. WESNER
BY
ATTORNEY United States Patent Office 3,169,501
Patented Feb. 16, 1965

3,169,501
SHIP STABILIZATION APPARATUS
Charles R. Wesner, Crozet, Va., assignor to Sperry Rand
Corporation, a corporation of Delaware
Filed Jan. 30, 1963, Ser. No. 254,922
4 Claims. (Cl. 114—126)

This invention relates generally to the stabilization of marine vessels and particularly to automatically compensating for the list angle of a vessel utilizing an automatic ship stabilization system.

In ship stabilization apparatus of the type shown in U.S. Patent No. 2,979,010, issued April 11, 1961 to F. D. Braddon et al., stabilizing fins project through the hull of the ship and are operated automatically in response to orders originating at sensing instruments mounted upon the ship to impose a torque upon the ship which opposes the undesired roll. While it is preferred that the ship stabilizing apparatus operate only to correct for undesirable roll conditions, it will also endeavor to maintain the ship vertical when the ship has a long term list angle. The long term list angle may be due to the inherent structural design of the vessel, unbalanced cargo stowage, continuous athwartship wind condition, or a number of other factors. It is undesirable to utilize the ship stabilization apparatus to correct the list condition since this would unnecessarily reduce the forward propulsive energy available as well as reduce the desired effectiveness of the stabilization system in performing its intended function of roll stabilization.

Previous attempts to compensate for the list angle in ship stabilization systems include a manual adjustment for list angle as shown in said U.S. Patent No. 2,979,010. It will be appreciated that it is difficult for an operator to accurately compensate for the list angle by a manual adjustment. Further, the list angle may change due to changing conditions and this change may go unnoticed by the human operator thereby resulting in the system operating inefficiently for some interim. The present invention automatically and continuously compensates for the list angle and relieves the operator of the manual adjustment thereby assuring continuous optimum performance of the ship stabilization system although the list angle may change.

A previous attempt to automatically compensate for the list angle is disclosed in U.S. Patent No. 2,923,874 entitled "Control Gear for Ship Stabilization" issued February 2, 1960 to John Bell. The arrangement disclosed in said U.S. Patent 2,923,874 is extremely cumbersome and requires an electromechanical servo integrator as well as linkages, all of which tend to reduce the reliability and accuracy of the system. Applicant's apparatus on the other hand provides a simple, compact, accurate and inexpensive apparatus for automatically providing list compensation.

It is a primary object of the present invention to provide automatic list compensation for ship stabilization systems which does not require manual adjustment by the human operator.

It is an additional object of the present invention to provide automatic list compensation for ship stabilization systems utilizing a minimum of additional equipment while providing reliability and ruggedness.

The above objects are achieved in the present invention by means of a highly damped accelerometer that is responsive to the roll movements of the ship to provide a signal representative of the list angle of the ship. A critically damped accelerometer is responsive to the roll movements of the ship to provide a signal representative of the instantaneous roll angle with respect to the vertical. By modifying the instantaneous roll angle signal with the list angle signal, an output signal is provided representative of the instantaneous roll angle with respect to the list angle which is introduced as a command signal into the ship stabilization system.

The single drawing is a schematic representation of a ship stabilization system incorporating the present invention.

The present invention will be described with respect to a ship stabilization system of the type shown in said Patent No. 2,979,010 as an improvement thereover.

It will be appreciated, however, that the present invention is equally applicable to other types of ship stabilization systems which do not use activated fins.

Referring now to the drawing, activated fin, ship roll stabilization systems usually utilize two stabilizing fins 10 and 11 (11 not shown), one projecting substantially horizontally from each side of the ship. The port and starboard fins 10 and 11 respectively are operated automatically and independently about normally substantially horizontal axes 12 and 13 respectively (13 not shown) in response to command signals originating at sensing instruments mounted on the ship to be stabilized. The sensing elements detect and measure the displacement, rate and acceleration of the ship's rolling motion and produce signals proportional to the ship's motion produced by all types of sea motion encountered in service. The fins 10 and 11 are operated through an electrohydraulic servo system 14 in a manner generally similar to that described in said Patent 2,979,010 to counteract the disturbing moments applied to the ship by wave action.

As disclosed in said Patent 2,979,010, the lift command signal for controlling the motion of the stabilizing fins 10 and 11 is a composite or summation of signals generated through the effects of ship motion on the signal generating sensing instruments. A linear accelerometer 15 is mounted with its sensitive axis disposed athwartship and is adapted to provide an alternating current signal having a phase depending upon the direction of the roll of the ship and an amplitude depending upon the magnitude of the roll. The linear accelerometer 15 is critically damped to provide a signal representative of the instantaneous roll angle of the ship with respect to the vertical.

The ship may have a list angle due to any of the conditions disclosed above. In the absence of the present invention, the accelerometer 15 would then provide a signal representative of the instantaneous roll angle with respect to the vertical which would cause the ship stabilization system to correct for the list angle instead of being used for its intended purpose of stabilizing against roll. In accordance with the present invention, the instantaneous roll angle signal from the accelerometer 15 is automatically compensated by a list angle signal from a highly damped linear accelerometer 16. The linear accelerometer 16 is mounted with its sensitive axis athwartship to provide an alternating current output having a phase depending upon the long term direction of the list angle and an amplitude depending upon the long term magnitude of the list angle. By modifying the instantaneous roll angle signal from the accelerometer 15 with the list angle signal from the accelerometer 16, the composite output signal is a control signal representative of the instantaneous roll angle of the ship about the list angle rather than the vertical. In this manner the list correction signal is provided automatically and continuously thereby providing accurate compensation under varying conditions instead of the approximate compensation previously provided by manual adjustment as disclosed in said U.S. Patent 2,979,010.

The list angle compensation signal from the accelerometer 16 may be arranged to modify the roll angle signal from the accelerometer 15 by connecting the list angle signal in phase opposition to the roll angle signal in the summing amplifier 17 of the servo system 14 or these signals may be subtracted from each other in any other suitable manner.

The lift command signal component proportional to roll rate is provided by means of a conventional rate gyro 20 which is mounted on the ship in order that precession thereof occurs upon rolling of the vessel about its longitudinal axis. The rate gyro 20 provides an alternating current signal having a phase depending upon the direction of the rolling motion and an amplitude depending upon the magnitude of such motion. The rate gyro 20 is also connected to the summing amplifier 17 to provide a roll rate signal that is in phase with the roll angle signal from the accelerometer 15.

The lift command signal component proportional to the roll acceleration is provided by means of an angular accelerometer 21 which is mounted to provide a signal having a phase and amplitude proportional respectively to the direction and magnitude of the angular acceleration of the ship about its longitudinal axis. The angular accelerometer 21 is also connected to the summing amplifier 17 to provide a roll acceleration signal in phase with the roll angle and roll rate signals.

In the operation of the present invention, the lift command signal from the summing amplifier 17 is a summation of signals representative of the instantaneous roll angle of the ship about the list angle, the roll rate, and the roll acceleration thereby providing a composite command signal which utilizes the full effectiveness of the stabilizing system to counteract roll and does not dissipate energy unnecessarily to correct for the list angle. The electrohydraulic servo system 14 in response to the lift command signal drives the port fin 10 in a manner generally similar to that described in said Patent 2,979,010 while providing a lift command signal of opposite phase to the starboard fin mechanism 11 as indicated by the legend, with the exception that the ship is stabilized with respect to the list angle rather than the vertical. Thus, the ship stabilization system by means of the present invention accurately and efficiently stabilizes the ship to compensate for the roll motion per se.

From the above explanation, it will be appreciated that the damping of the respective linear accelerometers 15 and 16 must be correct in order that the desired function is accurately achieved by each of the accelerometers. One combination which operates satisfactorily utilizes a flat spring type of linear accelerometers generally of the character disclosed in U.S. Patent No. 2,883,176 entitled "Accelerometer" issued April 21, 1959 to A. Bernstein, in which the accelerometer 15 is damped to 1.0 of critical by means of a 500 centistoke silicone fluid while the accelerometer 16 is of identical construction except that it is highly overdamped by means of a 60,000 centistoke fluid. This combination provides a vector difference between the two outputs which is representative of the instantaneous roll angle about the list angle rather than the vertical.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a ship stabilization apparatus, the combination of first accelerometer means mounted on said ship and responsive to roll movements of said ship for providing a signal representative of the instantaneous roll angle of said ship, second accelerometer means mounted on said ship and responsive to the roll movements of said ship for providing a signal representative of the list angle of said ship, and means for modifying said roll angle signal in accordance with said list angle signal for providing a signal representative of the roll angle of said ship with respect to said list angle.

2. In a ship stabilization apparatus, the combination of a critically damped accelerometer means mounted on said ship and responsive to the roll movements of said ship for providing a signal representative of the instantaneous roll angle, a highly damped accelerometer mounted on said ship and responsive to the roll movements of said ship for providing a signal representative of the long term list angle, and means responsive to said instantaneous roll angle signal and said long term list angle signal for providing a signal representative of the instantaneous roll angle of said ship with respect to said long term list angle.

3. Automatic list compensation apparatus for ship stabilization comprising, first accelerometer means having a first predetermined damping characteristic and responsive to the roll motion of said ship for providing a signal representative of the instantaneous roll angle of the ship in relation to the vertical, second accelerometer means having a second predetermined damping characteristic appreciably greater than that of said first accelerometer means and responsive to the roll motion of the ship for providing a signal representative of the long term list angle of the ship with respect to the vertical, and means connected to said first and second accelerometer means for providing a signal representative of the instantaneous roll angle of said ship with respect to its long term list angle.

4. In a ship stabilization apparatus for arresting rolling motions of a marine vessel comprising,
   (1) critically damped linear accelerometer means responsive to the roll movement of said vessel for providing a signal representative of the instantaneous roll angle of said vessel,
   (2) highly damped linear accelerometer means responsive to the roll movement of said vessel for providing a signal representative of the long term list angle of said vessel,
   (3) means responsive to the roll movement of said vessel for providing a signal representative of the roll rate thereof,
   (4) means responsive to the roll movement of said vessel for providing a signal representative of the roll acceleration thereof,
   (5) means responsive to said instantaneous roll angle, long term list angle, roll rate and roll acceleration signals for providing a composite signal representative of the roll angle of the vessel about the list angle, roll rate and roll acceleration,
   (6) and means responsive to said composite signal for stabilizing said vessel in roll.

References Cited in the file of this patent
UNITED STATES PATENTS

| | | |
|---|---|---|
| 2,883,176 | Bernstein | Apr. 21, 1959 |
| 2,923,874 | Bell | Feb. 2, 1960 |
| 2,979,010 | Braddon et al. | Apr. 10, 1961 |
| 3,045,630 | Foll et al. | July 24, 1962 |